(12) United States Patent
Aldana et al.

(10) Patent No.: US 9,973,949 B2
(45) Date of Patent: *May 15, 2018

(54) FTM PROTOCOL WITH ANGLE OF ARRIVAL AND ANGLE OF DEPARTURE

(71) Applicant: QUALCOMM Incorporated, San Diego, CA (US)

(72) Inventors: Carlos Horacio Aldana, Mountain View, CA (US); Xiaoxin Zhang, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

This patent is subject to a terminal disclaimer.

(21) Appl. No.: 15/013,374

(22) Filed: Feb. 2, 2016

(65) Prior Publication Data

US 2016/0234704 A1 Aug. 11, 2016

Related U.S. Application Data

(60) Provisional application No. 62/114,479, filed on Feb. 10, 2015.

(51) Int. Cl.
| | |
|---|---|
| *H04W 24/06* | (2009.01) |
| *H04L 1/16* | (2006.01) |
| *H04W 72/04* | (2009.01) |
| *H04L 12/26* | (2006.01) |
| *G01S 5/12* | (2006.01) |
| *G01S 13/74* | (2006.01) |

(52) U.S. Cl.
CPC ........... *H04W 24/06* (2013.01); *G01S 5/12* (2013.01); *G01S 13/74* (2013.01); *H04L 1/16* (2013.01);

(Continued)

(58) Field of Classification Search
CPC . H04W 24/06; H04W 72/0446; H04W 64/00; H04W 64/003; H04W 4/02–4/046;
(Continued)

(56) References Cited

U.S. PATENT DOCUMENTS

| | | | | |
|---|---|---|---|---|
| 2004/0203539 | A1* | 10/2004 | Benes | H04W 64/00 455/101 |
| 2008/0144591 | A1* | 6/2008 | Jokela | H04W 48/12 370/338 |

(Continued)

OTHER PUBLICATIONS

Bob O'Hara "Addition of a Vendor-specific Information Element" May 2004 https://mentor.ieee.org/802.11/dcn/04/11-04-0522-01-000m-vendor-specific-ie.doc.*

(Continued)

*Primary Examiner* — Maharishi Khirodhar
*Assistant Examiner* — Kenneth P Hunt
(74) *Attorney, Agent, or Firm* — Paradice and Li LLP

(57) ABSTRACT

Apparatuses and methods are disclosed that may perform ranging operations between an initiator device and a responder device. The initiator device may request the responder device to perform a ranging operation. The responder device may transmit a first fine timing measurement (FTM) frame to the initiator device, may receive an acknowledgement (ACK) frame from the responder device, and may transmit a second FTM frame to the initiator device. The second FTM frame may include a time value and angle information. The time value may indicate a difference between a time of departure (TOD) of the first FTM frame and a time of arrival (TOA) of the ACK frame. The angle information may indicate a direction of the initiator device relative to the responder device. The initiator device may determine its position, relative to the responder device, based at least in part on the received time value and angle information.

36 Claims, 12 Drawing Sheets

(52) U.S. Cl.
CPC ..... *H04L 43/0864* (2013.01); *H04W 72/0406* (2013.01); *H04W 72/0446* (2013.01)

(58) Field of Classification Search
CPC . G01S 5/12; G01S 13/74; G01S 11/04; G01S 5/00; G01S 5/0009; G01S 5/0045–5/0063; G01S 11/00; G01S 11/02; G01S 11/08; G01S 13/876; G01S 13/878; H04L 1/16; H04L 43/0864
USPC ...... 370/252; 455/456.1, 456.2, 456.5, 456.6
See application file for complete search history.

(56) References Cited

U.S. PATENT DOCUMENTS

| | | |
|---|---|---|
| 2014/0004877 A1 | 1/2014 | Van Diggelen et al. |
| 2014/0070996 A1* | 3/2014 | Kneckt ............... H04W 64/006 342/386 |
| 2014/0073352 A1 | 3/2014 | Aldana et al. |
| 2014/0187259 A1 | 7/2014 | Kakani et al. |
| 2014/0335891 A1 | 11/2014 | Zhang et al. |
| 2015/0264530 A1* | 9/2015 | Prechner ............... H04W 4/025 455/456.2 |
| 2016/0202344 A1* | 7/2016 | Sanderovich ............. G01S 5/06 455/456.1 |
| 2016/0234703 A1* | 8/2016 | Aldana ................ H04L 43/0864 |
| 2016/0366548 A1* | 12/2016 | Wang .................... H04W 64/00 |

OTHER PUBLICATIONS

International Search Report and Written Opinion—PCT/US2016/016377—ISA/EPO—May 20, 2016.

* cited by examiner

| Category | Public Action | Dialogue Token | Follow Up Dialogue Token | TOD | TOA | TOD Error | TOA Error | LCI Report (optional) | Location Civic Report (optional) | Fine Timing Measurement Parameters (optional) | AoA (optional) | AoD (optional) |
|---|---|---|---|---|---|---|---|---|---|---|---|---|
| 601 | 602 | 603 | 604 | 605 | 606 | 607 | 608 | 609 | 610 | 611 | 612 | 613 |

FIG. 6

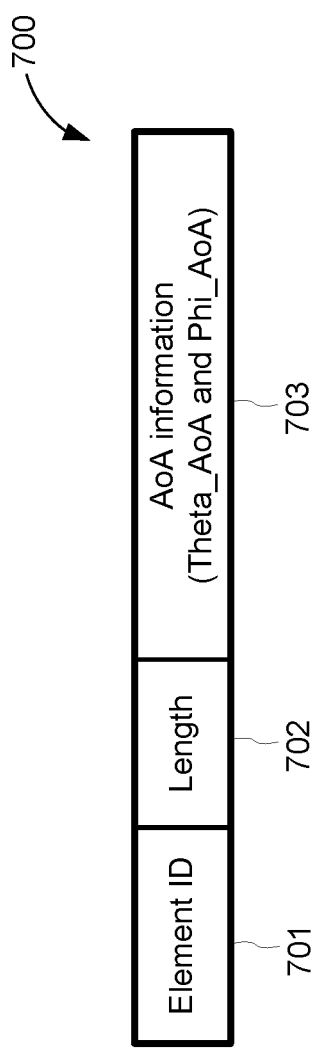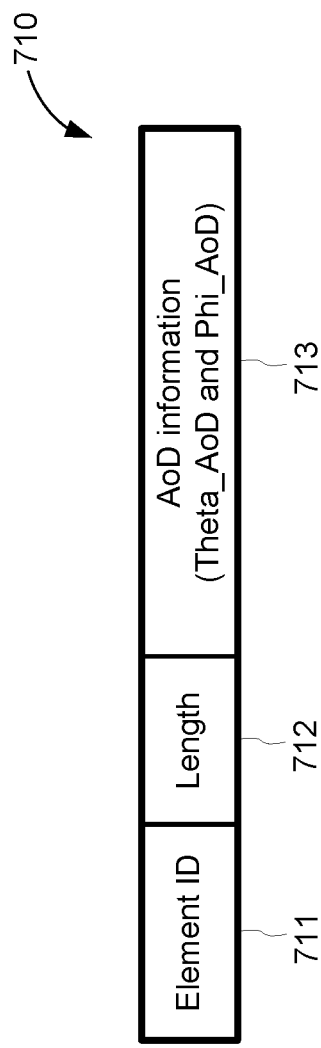
FIG. 7A
FIG. 7B

FTM PROTOCOL WITH ANGLE OF ARRIVAL AND ANGLE OF DEPARTURE

RELATED APPLICATION

This application claims priority to U.S. Provisional Patent Application No. 62/114,479, titled "FTM Protocol with Angle of Arrival and Angle of Departure," filed Feb. 10, 2015, which is hereby incorporated by reference in its entirety.

TECHNICAL FIELD

The example embodiments relate generally to wireless networks, and specifically to ranging operations performed between wireless devices.

BACKGROUND OF RELATED ART

The recent proliferation of Wi-Fi® access points in wireless local area networks (WLANs) has made it possible for positioning systems to use these access points for position determination, especially in areas where there are a large concentration of active Wi-Fi access points (e.g., urban cores, shopping centers, office buildings, sporting venues, and so on). For example, a wireless device such as a cell phone or tablet computer may use the round trip time (RTT) of signals exchanged with an access point (AP) to determine the distance between the wireless device and the AP. Once the distances between the wireless device and three APs having known locations are determined, the location of the wireless device may be determined using trilateration techniques.

It would be desirable to determine the location of a wireless device using a fewer number of other devices as reference points without sacrificing accuracy.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Apparatuses and methods are disclosed that may allow a wireless device to determine its position using signal exchanges with one other device. For some implementations, a method is disclosed in which a first device may transmit a first fine timing measurement (FTM) frame to a second device, may receive an acknowledgement (ACK) frame from the second device, and may transmit a second FTM frame to the second device. The second FTM frame may include a time value and angle information. The time value may indicate a difference between a time of departure (TOD) of the first FTM frame and a time of arrival (TOA) of the ACK frame, and the angle information may indicate a direction of the second device relative to the first device. In some aspects, the angle information may include an angle of departure (AoD) of the first FTM frame and/or an angle of arrival (AoA) of the ACK frame. The second device may use the time value and angle information to determine its location relative to the first device.

In another example, a first device that may perform a ranging operation with a second device is disclosed. The first device may include one or more processors and a memory configured to store instructions. Execution of the instructions by the one or more processors may cause the first device to: transmit a first FTM frame to the second device, receive an ACK frame from the second device, and transmit a second FTM frame to the second device. The second FTM frame may include a time value and angle information. The time value may indicate a difference between a TOD of the first FTM frame and a TOA of the ACK frame, and the angle information may indicate a direction of the second device relative to the first device. In some aspects, the angle information may include an AoD of the first FTM frame and/or an AoA of the ACK frame. The second device may use the time value and angle information to determine its location relative to the first device.

In another example, a non-transitory computer-readable storage medium is disclosed. The non-transitory computer-readable storage medium may store one or more programs containing instructions that, when executed by one or more processors of a first device, cause the first device to perform a ranging operation with a second device by performing a number of operations. The number of operations may include transmitting a first FTM frame to the second device, receiving an ACK frame from the second device, and transmitting a second FTM frame to the second device. The second FTM frame may include a time value and angle information. The time value may indicate a difference between a TOD of the first FTM frame and a TOA of the ACK frame, and the angle information may indicate a direction of the second device relative to the first device. In some aspects, the angle information may include an AoD of the first FTM frame and/or an AoA of the ACK frame. The second device may use the time value and angle information to determine its location relative to the first device.

In another example, a first device that may perform a ranging operation with a second device is disclosed. The first device may include means for transmitting a first FTM frame to the second device, means for receiving an ACK frame from the second device, and means for transmitting a second FTM frame to the second device. The second FTM frame may include a time value and angle information. The time value may indicate a difference between a TOD of the first FTM frame and a TOA of the ACK frame, and the angle information may indicate a direction of the second device relative to the first device. In some aspects, the angle information may include an AoD of the first FTM frame and/or an AoA of the ACK frame. The second device may use the time value and angle information to determine its location relative to the first device.

BRIEF DESCRIPTION OF THE DRAWINGS

The example embodiments are illustrated by way of example and are not intended to be limited by the figures of the accompanying drawings. Like numbers reference like elements throughout the drawings and specification.

FIG. 6 depicts an example FTM frame in accordance with example embodiments.

FIG. 7A depicts an example angle of arrival field of the FTM frame of FIG. 6, in accordance with example embodiments.

FIG. 7B depicts an example angle of departure field of the FTM frame of FIG. 6, in accordance with example embodiments.

DETAILED DESCRIPTION

Figure 1:
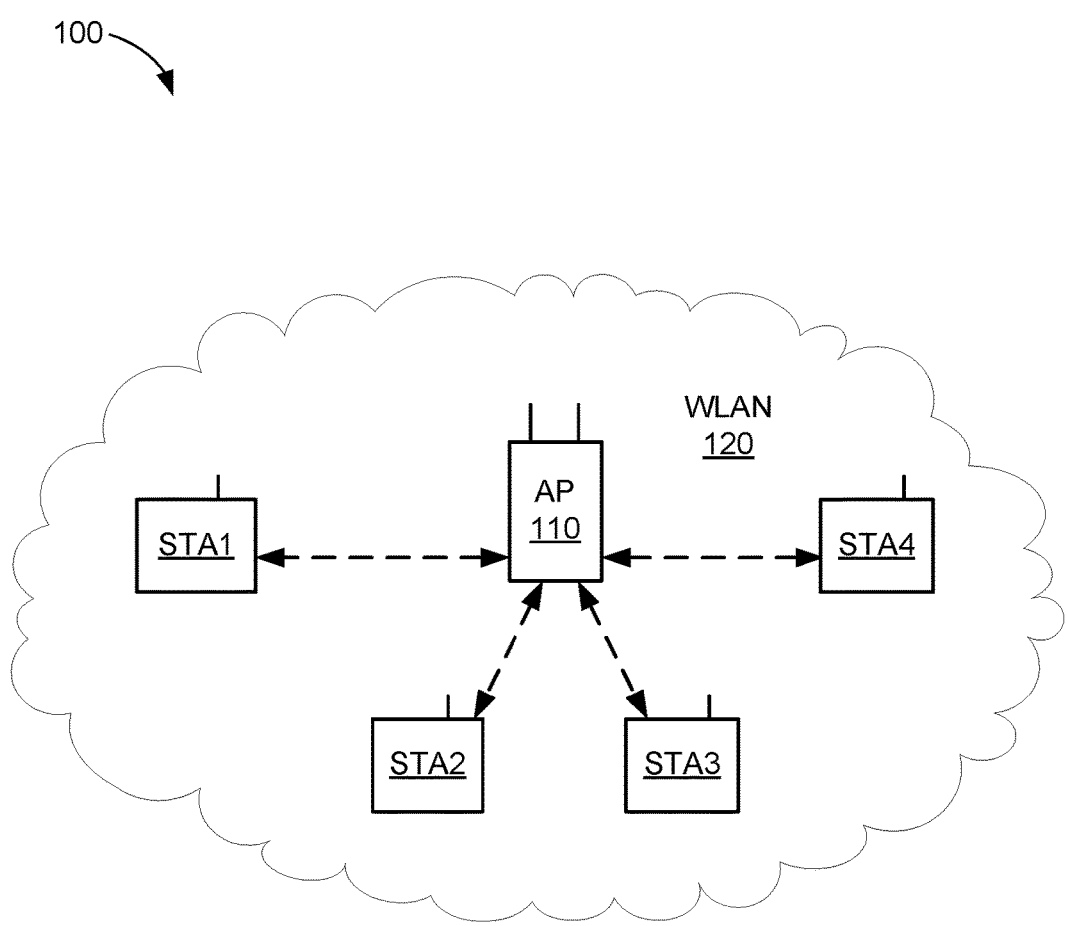
FIG. 1 is a block diagram of a WLAN system within which the example embodiments may be implemented.

The example embodiments are described below in the context of ranging operations performed by and between Wi-Fi enabled devices for simplicity only. It is to be understood that the example embodiments are equally applicable for performing ranging operations using signals of other various wireless standards or protocols, and for performing ranging operations between various devices (e.g., between a STA and a wireless AP, between APs, between STAs, and so on). Thus, although the example embodiments are described below in the context of a WLAN system, the example embodiments are equally applicable to other wireless networks (e.g., cellular networks, pico networks, femto networks, satellite networks), as well as for systems using signals of one or more wired standards or protocols (e.g., Ethernet and/or HomePlug/PLC standards). As used herein, the terms WLAN and Wi-Fi may include communications governed by the IEEE 802.11 standards, Bluetooth, Hiper-LAN (a set of wireless standards, comparable to the IEEE 802.11 standards, used primarily in Europe), and other technologies having relatively short radio propagation range. Thus, the terms "WLAN" and "Wi-Fi" may be used interchangeably herein.

In addition, although described below in terms of an infrastructure WLAN system including one or more APs and a number of STAs, the example embodiments are equally applicable to other WLAN systems including, for example, multiple WLANs, Independent Basic Service Set (IBSS) systems, peer-to-peer systems (e.g., operating according to the Wi-Fi Direct protocols), and/or Hotspots. In addition, although described herein in terms of exchanging data frames between wireless devices, the example embodiments may be applied to the exchange of any data unit, packet, frame, and/or signal between wireless devices. Thus, the term "frame" may include any signal, frame, packet, or data unit such as, for example, protocol data units (PDUs), media access control (MAC) protocol data units (MPDUs), and physical layer convergence procedure protocol data units (PPDUs). The term "A-MPDU" may refer to aggregated MPDUs. As used herein, the term "time value" may refer to a difference in time between a time of departure (TOD) of one frame from a given device and a time of arrival (TOA) of another frame at the given device. Further, the term "angle information" may refer to information indicating a direction of one device relative to another device and/or to information from which the direction of one device relative to another device may be derived.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise.

In the following description, numerous specific details are set forth such as examples of specific components, circuits, and processes to provide a thorough understanding of this disclosure. Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example embodiments are not to be construed as limited to specific examples described herein but rather to include within their scopes all embodiments defined by the appended claims.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that may be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other suitable configuration.

FIG. 1 is a block diagram of a wireless system 100 within which the example embodiments may be implemented. The wireless system 100 is shown to include four wireless stations STA1-STA4, a wireless access point (AP) 110, and a wireless local area network (WLAN) 120. The WLAN 120 may be formed by a plurality of Wi-Fi access points (APs) that may operate according to the IEEE 802.11 family of standards (or according to other suitable wireless protocols). Thus, although only one AP 110 is shown in FIG. 1 for simplicity, it is to be understood that WLAN 120 may be formed by any number of access points such as AP 110. The AP 110 is assigned a unique media access control (MAC) address that is programmed therein by, for example, the manufacturer of the access point. Similarly, each of stations STA1-STA4 is also assigned a unique MAC address. For some embodiments, the wireless system 100 may correspond to a multiple-input multiple-output (MIMO) wireless network, and may support single-user MIMO (SU-MIMO) and multi-user (MU-MIMO) communications. Further, although the WLAN 120 is depicted in FIG. 1 as an infrastructure BSS, for other example embodiments, WLAN 120 may be an IBSS, an ad-hoc network, or a peer-to-peer (P2P) network (e.g., operating according to the Wi-Fi Direct protocols).

Each of stations STA1-STA4 may be any suitable Wi-Fi enabled wireless device including, for example, a cell phone, personal digital assistant (PDA), tablet device, laptop computer, or the like. Each of stations STA1-STA4 may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. For at least some embodiments, each of stations STA1-STA4 may include one or more transceivers, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 5A, 5B, and 11.

The AP 110 may be any suitable device that allows one or more wireless devices to connect to a network (e.g., a local area network (LAN), wide area network (WAN), metropolitan area network (MAN), and/or the Internet) via AP 110 using Wi-Fi, Bluetooth, or any other suitable wireless communication standards. For at least one embodiment, AP 110 may include one or more transceivers, one or more processing resources (e.g., processors and/or ASICs), one or more memory resources, and a power source. The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 5A, 5B, and 11.

For the stations STA1-STA4 and/or AP 110, the one or more transceivers may include Wi-Fi transceivers, Bluetooth transceivers, cellular transceivers, and/or other suitable radio frequency (RF) transceivers (not shown for simplicity) to transmit and receive wireless communication signals. Each transceiver may communicate with other wireless devices in distinct operating frequency bands and/or using distinct communication protocols. For example, the Wi-Fi transceiver may communicate within a 2.4 GHz frequency band, within a 5 GHz frequency band in accordance with the IEEE 802.11 specification, and/or within a 60 GHz frequency band. The cellular transceiver may communicate within various RF frequency bands in accordance with a 4G Long Term Evolution (LTE) protocol described by the 3rd Generation Partnership Project (3GPP) (e.g., between approximately 700 MHz and approximately 3.9 GHz) and/or in accordance with other cellular protocols (e.g., a Global System for Mobile (GSM) communications protocol). In other embodiments, the transceivers included within each of the stations STA1-STA4 may be any technically feasible transceiver such as a ZigBee transceiver described by a specification from the ZigBee specification, a WiGig transceiver, and/or a HomePlug transceiver described a specification from the HomePlug Alliance.

For at least some embodiments, each of the stations STA1-STA4 and AP 110 may include radio frequency (RF) ranging circuitry (e.g., formed using well-known software modules, hardware components, and/or a suitable combination thereof) that may be used to estimate the distance between itself and another Wi-Fi enabled device and to determine the location of itself, relative to one or more other wireless devices, using ranging techniques described herein. In addition, each of the stations STA1-STA4 and/or AP 110 may include a local memory (not shown in FIG. 1 for simplicity) to store a cache of Wi-Fi access point and/or station data.

For at least some embodiments, ranging operations described herein may be performed without using the AP 110, for example, by having a number of the stations operating in an ad-hoc or peer-to-peer mode, thereby allowing the stations to range one another even when outside the reception range of AP 110 or a visible WLAN (or other wireless network). In addition, for at least some example embodiments, ranging operations described herein may be performed between two APs that are in wireless range of each other.

Figure 2:
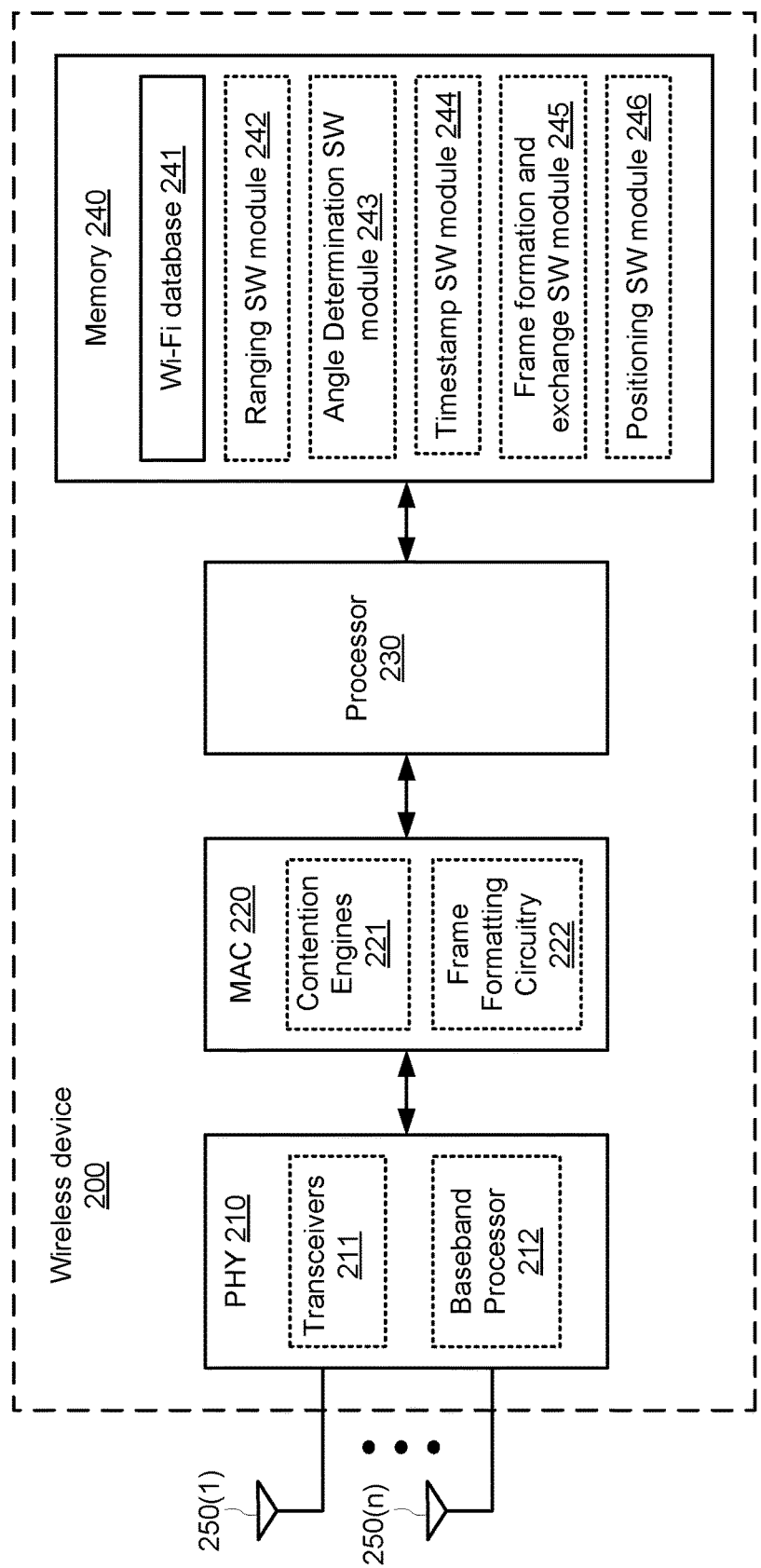
FIG. 2 is a block diagram of a wireless device in accordance with example embodiments.

FIG. 2 shows a wireless device 200 that may be one embodiment of the stations STA1-STA4 and/or AP 110 of FIG. 1. The wireless device 200 may include a PHY device 210 including at least a number of transceivers 211 and a baseband processor 212, may include a MAC 220 including at least a number of contention engines 221 and frame formatting circuitry 222, may include a processor 230, may include a memory 240, and may include a number of antennas 250(1)-250(n). The transceivers 211 may be coupled to antennas 250(1)-250(n), either directly or through an antenna selection circuit (not shown for simplicity). The transceivers 211 may be used to transmit signals to and receive signals from AP 110, other stations, and/or other suitable wireless devices (see also FIG. 1), and may be used to scan the surrounding environment to detect and identify nearby access points and other wireless devices (e.g., within wireless range of wireless device 200). Although not shown in FIG. 2 for simplicity, the transceivers 211 may include any number of transmit chains to process and transmit signals to other wireless devices via antennas 250(1)-250(n), and may include any number of receive chains to process signals received from antennas 250(1)-250(n). Thus, for example embodiments, the wireless device 200 may be configured for MIMO operations. The MIMO operations may include SU-MIMO operations and/or MU-MIMO operations.

The baseband processor 212 may be used to process signals received from processor 230 and/or memory 240 and to forward the processed signals to transceivers 211 for transmission via one or more of antennas 250(1)-250(n), and may be used to process signals received from one or more of antennas 250(1)-250(n) via transceivers 211 and to forward the processed signals to processor 230 and/or memory 240.

For purposes of discussion herein, MAC 220 is shown in FIG. 2 as being coupled between PHY device 210 and processor 230. For actual embodiments, PHY device 210, MAC 220, processor 230, and/or memory 240 may be connected together using one or more buses (not shown for simplicity).

The contention engines 221 may contend for access to one or more shared wireless mediums, and may also store packets for transmission over the one or more shared wireless mediums. For other embodiments, the contention engines 221 may be separate from MAC 220. For still other embodiments, the contention engines 221 may be implemented as one or more software modules (e.g., stored in memory 240 or stored in memory provided within MAC 220) containing instructions that, when executed by processor 230, perform the functions of contention engines 221.

The frame formatting circuitry 222 may be used to create and/or format frames received from processor 230 and/or memory 240 (e.g., by adding MAC headers to PDUs provided by processor 230), and may be used to re-format frames received from PHY device 210 (e.g., by stripping MAC headers from frames received from PHY device 210).

Memory 240 includes a Wi-Fi database 241 that may store location data, configuration information, data rates, MAC addresses, and other suitable information about (or pertaining to) a number of access points, stations, and/or other wireless devices. The Wi-Fi database 241 may also store profile information for a number of wireless devices. The profile information for a given wireless device may include information including, for example, the wireless device's service set identification (SSID), channel information, received signal strength indicator (RSSI) values, goodput values, channel state information (CSI), and connection history with wireless device 200.

Memory 240 may also include a non-transitory computer-readable medium (e.g., one or more nonvolatile memory elements, such as EPROM, EEPROM, Flash memory, a hard drive, and so on) that may store the following software (SW) modules:
  a ranging SW module 242 to determine RTT values and/or to estimate the distance between wireless device 200 and one or more other devices, for example, as described below for one or more operations of FIGS. 5A, 5B, and 11;
  an angle determination SW module 243 to determine angle of arrival (AoA) information of signals received by wireless device 200 and/or to determine angle of departure (AoD) information of signals transmitted from wireless device 200, for example, as described below for one or more operations of FIGS. 5A, 5B, and 11;
  a timestamp SW module 244 to capture timestamps of signals received by wireless device 200 (e.g., TOA information) and/or to capture timestamps of signals transmitted from wireless device 200 (e.g., TOD information), for example, as described below for one or more operations of FIGS. 5A, 5B, and 11;
  a frame formation and exchange SW module 245 to create, send, and/or receive frames or packets and/or to embed TOA information, TOD information, AoA information, and/or AoD information into selected frames or packets, for example, as described below for one or more operations of FIGS. 5A, 5B, and 11; and
  a positioning SW module 246 to determine the location of wireless device 200 based on the distances determined by the ranging SW module 242 and/or the angle information determined by the angle determination SW module 243, for example, as described below for one or more operations of FIGS. 5A, 5B, and 11.

Each software module includes instructions that, when executed by processor 230, cause the wireless device 200 to perform the corresponding functions. The non-transitory computer-readable medium of memory 240 thus includes instructions for performing all or a portion of the operations of FIGS. 5A, 5B, and 11.

Processor 230, which is coupled to PHY 210, MAC 220, and memory 240, may be one or more suitable processors capable of executing scripts or instructions of one or more software programs stored in wireless device 200 (e.g., within memory 240). For example, processor 230 may execute the ranging SW module 242 to determine RTT values and/or to estimate the distance between wireless device 200 and one or more other devices. Processor 230 may execute the angle determination SW module 243 to determine AoA information of signals received by wireless device 200 and/or to determine AoD information of signals transmitted from wireless device 200. Processor 230 may execute the timestamp SW module 244 to capture timestamps of signals received by wireless device 200 (e.g., TOA information) and/or to capture timestamps of signals transmitted from wireless device 200 (e.g., TOD information). Processor 230 may execute the frame formation and exchange SW module 245 to create, send, and/or receive frames or packets and/or to embed TOA information, TOD information, AoA information, and/or AoD information into selected frames or packets. Processor 230 may execute the positioning SW module 246 to determine the location of wireless device 200 based on the distances determined by the ranging SW module 242, the angle information determined by the angle determination SW module 243, and/or other suitable information indicative of the position of wireless device 200 relative to one or more other devices.

Figure 3:
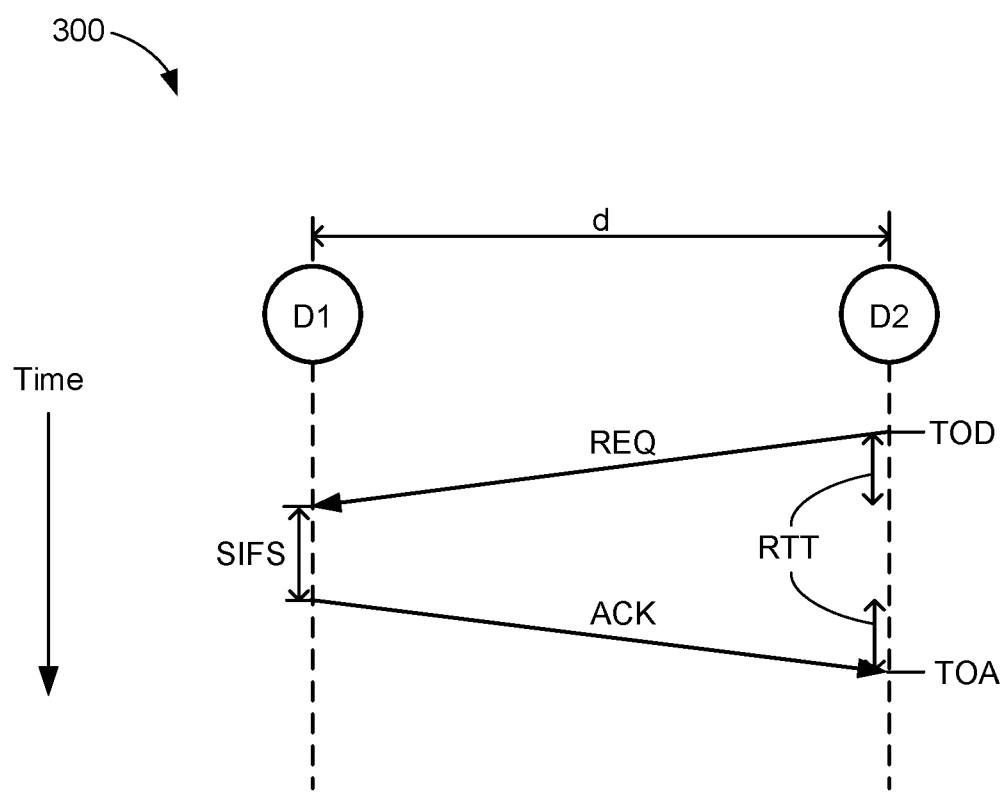
FIG. 3 shows a signal diagram of an example ranging operation.

As mentioned above, the distance between a pair of devices may be determined using the RTT of signals exchanged between the devices. For example, FIG. 3 shows a signal diagram of an example ranging operation 300 between a first device D1 and a second device D2. The distance (d) between the first device D1 and the second device D2 may be estimated as d=c*RTT/2, where c is the speed of light, and RTT is the summation of the actual signal propagation times of a request (REQ) frame and an acknowledgement (ACK) frame exchanged between device D1 and device D2. Device D1 and device D2 may each be, for example, an access point (e.g., AP 110 of FIG. 1), a station (e.g., one of stations STA1-STA4 of FIG. 1), or another suitable wireless device (e.g., wireless device 200 of FIG. 2).

More specifically, device D2 may estimate the RTT between itself and device D1 using the time of departure (TOD) of the REQ frame transmitted from device D2, the time of arrival (TOA) of the ACK frame received by device D2, and the SIFS duration of device D1. The SIFS duration, which stands for the short interframe space duration, indicates the duration of time between device D1 receiving the REQ frame and transmitting the ACK frame. The SIFS duration, a range of values for which are provided by the IEEE 802.11 standards, provides Wi-Fi enabled devices time to switch their transceivers from a receive mode (e.g., to receive the REQ frame) to a transmit mode (e.g., to transmit the ACK frame).

Because different make-and-models (and sometimes even same make-and-models) of communication devices have different processing delays, the precise value of SIFS may vary between devices (and even between successive frame receptions/transmissions in the same device). As a result, the value of SIFS is typically estimated, which often leads to errors in estimating the distance between two devices. More specifically, the IEEE 802.11 standards define the SIFS duration as 10 us+/−900 ns at 2.4 GHz, 16 us+/−900 ns at 5 GHz, and 3 us+/−900 ns at 60 GHz. These "standard" SIFS durations include tolerances that may decrease the accuracy of RTT estimates. For example, even if the SIFS duration of device D1 may be estimated within +/−25 ns, a ranging error of +/−7.5 meters may result (which may be unacceptable for many positioning systems).

Figure 4:
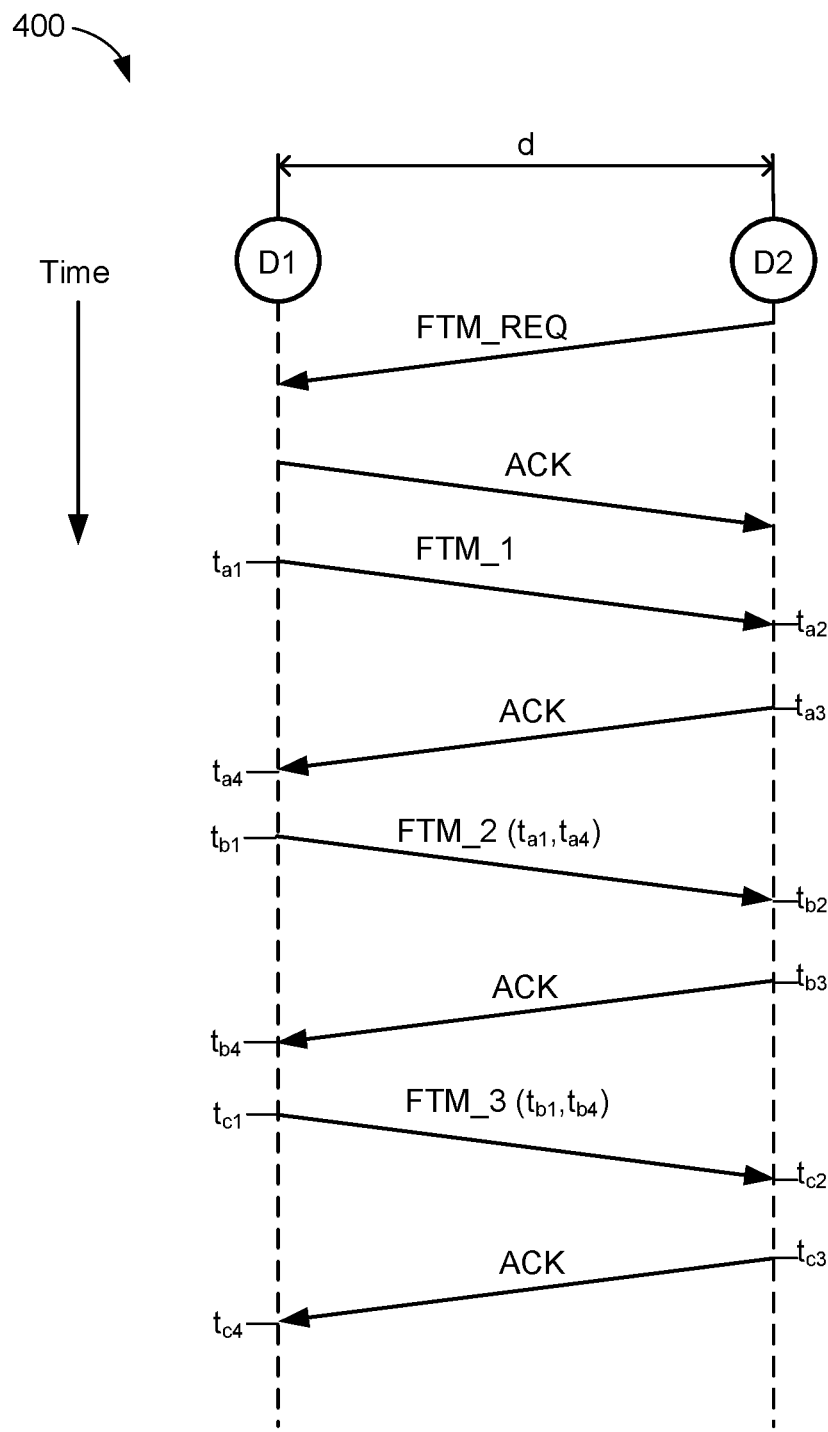
FIG. 4 shows a signal diagram of another example ranging operation.

To reduce ranging errors resulting from uncertainties in the value of SIFS, recent revisions to the IEEE 802.11 standards call for each ranging device to capture timestamps of incoming and outgoing frames so that the value of RTT may be determined without using SIFS. For example, FIG. 4 shows a signal diagram of an example ranging operation 400 between device D1 and device D2 performed using Fine Timing Measurement (FTM) frames in accordance with the IEEE 802.11 REVmc standards. Device D1 and device D2 may each be, for example, an access point (e.g., AP 110 of FIG. 1), a station (e.g., one of stations STA1-STA4 of FIG. 1), or other suitable wireless device (e.g., wireless device 200 of FIG. 2). For the example of FIG. 4, device D2 requests the ranging operation; thus, device D2 is the initiator device (or alternatively the requestor device) and device D1 is the responder device. Note that the term "initiator device" may also refer to an initiator STA, and the term "responder device" may also refer to a responder STA.

Device D2 may request or initiate the ranging operation by transmitting an FTM request (FTM_REQ) frame to device D1. The FTM_REQ frame may also include a request for device D1 to capture timestamps (e.g., TOA information) of frames received by device D1 and to capture timestamps (e.g., TOD information) of frames transmitted from device D1. Device D1 receives the FTM_REQ frame, and may acknowledge the requested ranging operation by transmitting an acknowledgement (ACK) frame to device D2. The ACK frame may indicate whether device D1 is capable of capturing the requested timestamps. It is noted that the exchange of the FTM_REQ frame and the ACK frame is a handshake process that not only signals an intent to perform a ranging operation but also allows devices D1 and D2 to determine whether each other supports capturing timestamps.

At time $t_{a1}$, device D1 transmits a first FTM (FTM_1) frame to device D2, and may capture the TOD of the FTM_1 frame as time $t_{a1}$. Device D2 receives the FTM_1 frame at time $t_{a2}$, and may capture the TOA of the FTM_1 frame as time $t_{a2}$. Device D2 responds by transmitting an ACK frame to device D1 at time $t_{a3}$, and may capture the TOD of the ACK frame as time $t_{a3}$. Device D1 receives the ACK frame at time $t_{a4}$, and may capture the TOA of the ACK frame at time $t_{a4}$. At time $t_{b1}$, device D1 transmits to device D2 a second FTM (FTM_2) frame that includes the timestamps captured at times $t_{a1}$ and $t_{a4}$ (e.g., the TOD of the FTM_1 frame and the TOA of the ACK frame). Device D2 receives the FTM_2 frame at time $t_{b2}$, and may capture its timestamp as time $t_{b2}$. Device D2 transmits an ACK frame to device D1 at time $t_{b3}$. Device D1 receives the ACK frame at time $t_{b4}$. This process may continue for any number of subsequent FTM and ACK frame exchanges between devices D1 and D2, for example, where device D1 embeds the timestamps of a given FTM and ACK frame exchange into a subsequent FTM frame transmitted to device D2.

Upon receiving the FTM_2 frame at time $t_{b2}$, device D2 has timestamp values for times $t_{a1}$, $t_{a2}$, $t_{a3}$, and $t_{a4}$ that correspond to the TOD of the FTM_1 frame transmitted from device D1, the TOA of the FTM_1 frame at device D2, the TOD of the ACK frame transmitted from device D2, and the TOA of the ACK frame at device D1, respectively. Thereafter, device D2 may determine RTT as $(t_{a4}-t_{a3})+(t_{a2}-t_{a1})$. Because the RTT estimate does not involve estimating SIFS for either device D1 or device D2, the RTT estimate does not involve errors resulting from uncertainties of SIFS durations. Consequently, the accuracy of the resulting estimate of the distance between devices D1 and D2 is improved (e.g., as compared to the ranging operation 300 of FIG. 3). A device may perform this ranging operation with at least three other devices having known locations, and use known trilateration techniques to estimate its location.

Note that the example ranging operation 400 may continue. For example, device D2 may transmit an ACK frame to device D1 at time $t_{b3}$ (e.g., to acknowledge reception of the FTM_2 frame). Device D1 receives the ACK frame at time $t_{b4}$, and may record the TOA of the ACK frame as time $t_{b4}$. Device D1 may embed another time value in an FTM_3 frame, and then transmit the FTM_3 frame to device D2 at time $t_{b1}$. The time value embedded in the FTM_3 frame may indicate a difference time value equal to $t_{b4}-t_{b1}$.

While RTT techniques may be used to determine a given device's location relative to another device, the given device may need to perform ranging operations with three other devices to determine its actual position. More specifically, performing ranging operation 400 with three other devices may involve three separate exchanges of FTM frames (with the three other devices), which not only consumes valuable time but also consumes limited bandwidth of a shared wireless medium. These are at least some of the technical problems to be solved by the example embodiments.

Two measurements that may be used in addition to RTT information to determine the relative positions of two wireless devices are the angle of arrival (AoA) of signals received by the devices and the angle of departure (AoD) of signals transmitted by the devices. For example, if a second device has RTT information between itself and a first device, then the second device may estimate the distance between itself and the first device, as described above with respect to FIG. 4. If the second device also has AoA information and/or AoD information for frames exchanged with the first device, then the second device may determine a direction of itself relative to the first device (e.g., an angle between the first and second devices relative to a reference line or direction). The second device may then use the determined direction and the RTT information to estimate its position relative to the first device. Further, if the position of the first device is known by the second device, then the second device may determine its actual position using the known position of the first device, the distance between the first and second devices, and the direction of the second device relative to the first device. Accordingly, it would be advantageous to exchange AoA information and/or AoD information during ranging operations, for example, so that a wireless device may estimate its actual position using the known position of only one other wireless device.

Thus, example apparatuses and methods are disclosed that may allow AoA information and/or AoD information to be exchanged between wireless devices during ranging operations without additional frame exchanges. More specifically, for at least some embodiments, a first device may determine AoA information and/or AoD information of frames exchanged with a second device during a ranging operation, and then embed the determined AoA information and/or AoD information in a subsequent FTM frame transmitted to the second device. In this manner, the second device may use the estimated distance to the first device, the direction of the first device relative to the second device, and a known location of the first device to determine the actual position of the second device. These and other details of the example embodiments, which provide one or more technical solutions to the aforementioned technical problems, are described in more detail below.

Figure 5A:
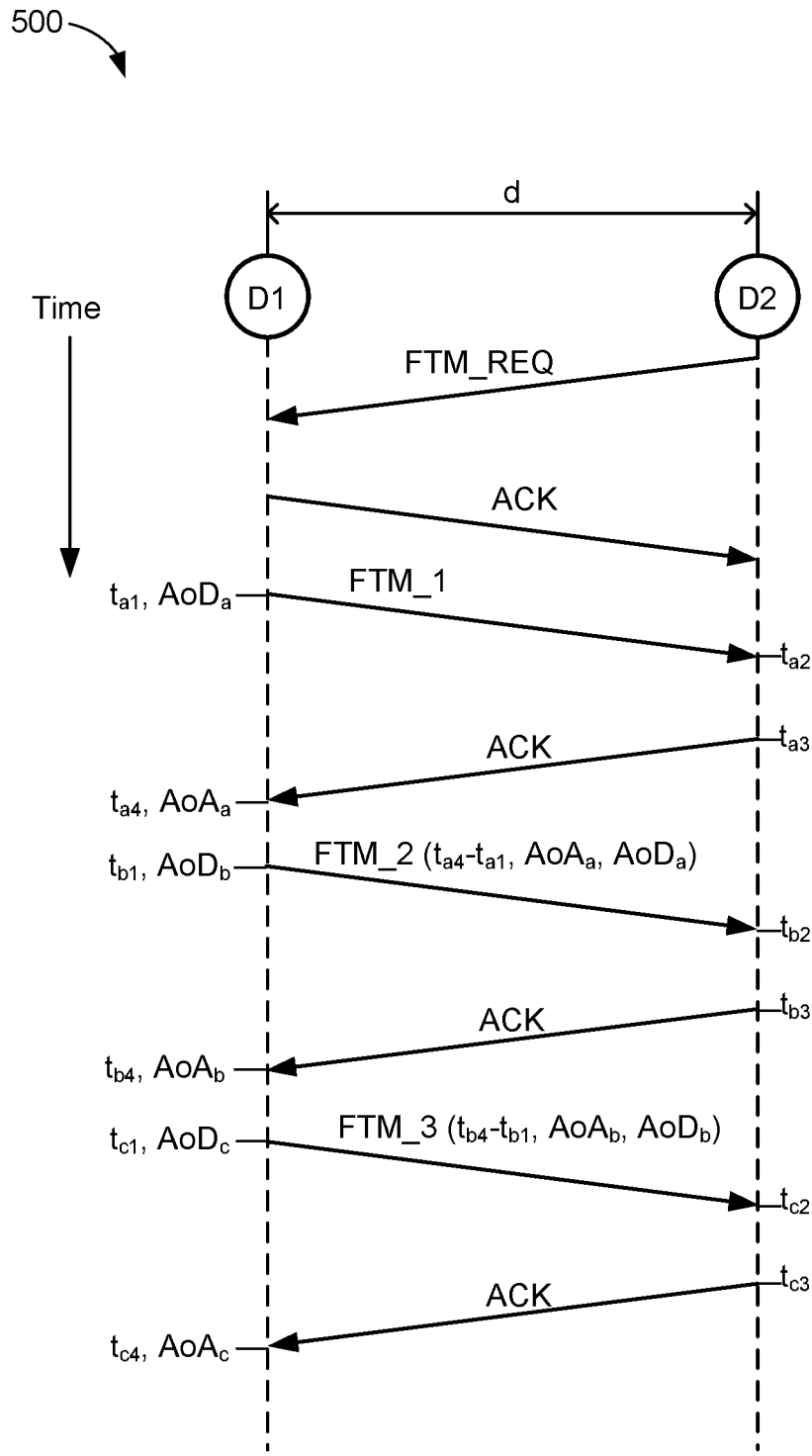
FIG. 5A shows a signal diagram of a ranging operation in accordance with example embodiments.
Figure 5B:
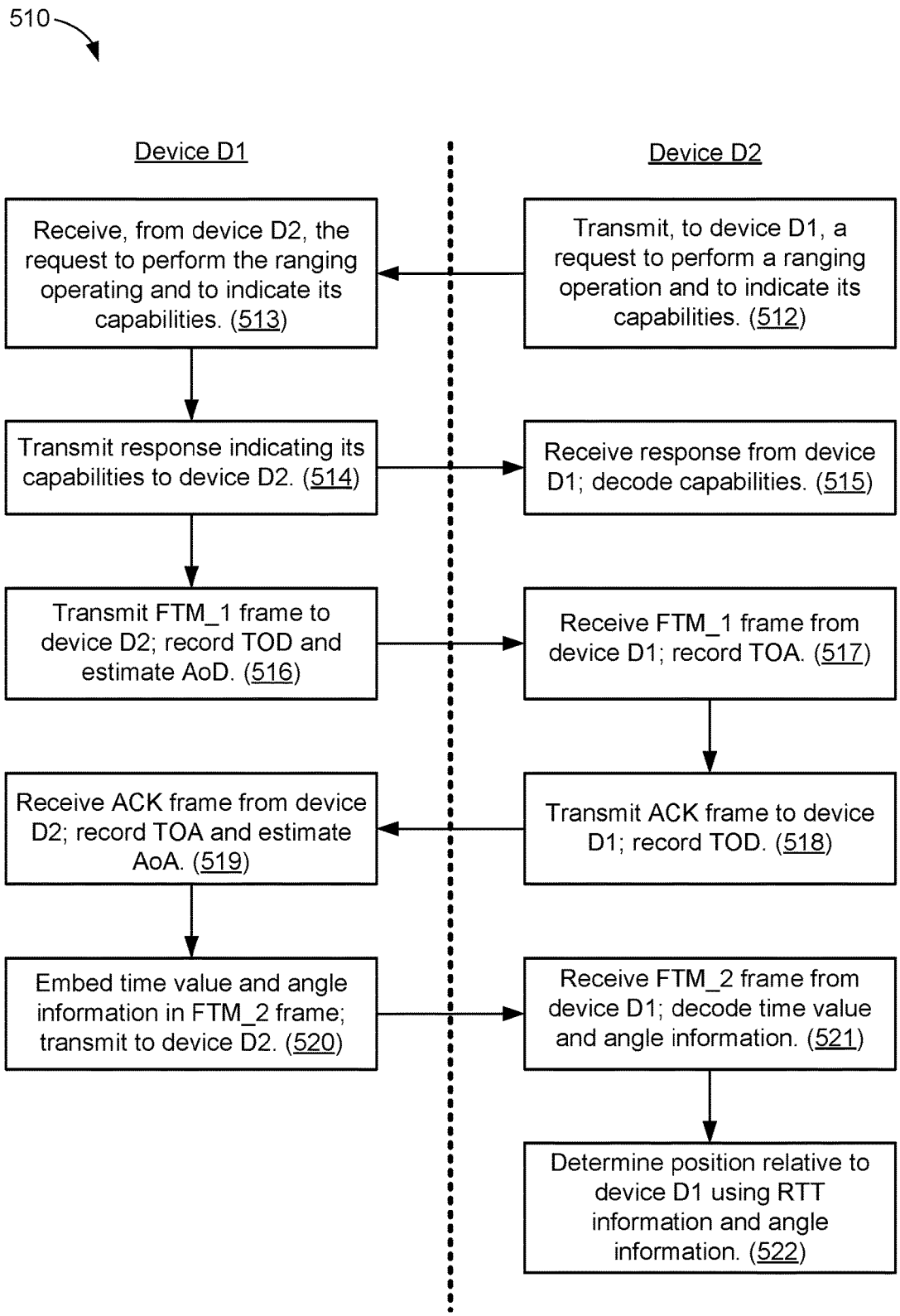
FIG. 5B shows a sequence diagram depicting the ranging operation of FIG. 5A in accordance with example embodiments.

FIG. 5A shows a signal diagram of a ranging operation 500 between a first device D1 and a second device D2 in accordance with example embodiments, and FIG. 5B shows a sequence diagram 510 depicting the example ranging operation 500 of FIG. 5A. Device D1 and device D2 may each be, for example, an access point (e.g., AP 110 of FIG. 1), a station (e.g., one of stations STA1-STA4 of FIG. 1), or another suitable wireless device (e.g., wireless device 200 of FIG. 2).

As the initiator device, device D2 may transmit, to device D1, a request to perform a ranging operation and to indicate its capabilities (512). The requested capabilities may include, for example, the ability to estimate AoA and AoD information and/or the ability to capture timestamps. For some implementations, the request may be an FTM_REQ frame, as depicted in FIG. 5A. The FTM_REQ frame may include a request for device D1 to estimate AoA and/or AoD information. The FTM_REQ frame may also request a level of accuracy for the estimated AoA and/or AoD information. Device D1 may receive the request to perform the ranging operation and to indicate its capabilities to device D2 (513).

As the responder device, device D1 may respond to the request by transmitting a response to device D2 (514). For some implementations, the response may be an ACK frame, as depicted in FIG. 5A. The ACK frame may indicate whether device D1 is capable of capturing timestamps, may indicate whether device D1 is capable of estimating AoA and AoD information, and/or may indicate a level of accuracy for the estimated AoA and AoD information. Device D2 may receive the response from device D1, and decode the capabilities (if any) provided by device D1 (515).

After the above handshake process, devices D1 and D2 may exchange FTM frames to perform the ranging operation 500. At time $t_{a1}$, device D1 transmits an FTM_1 frame to device D2, records the TOD of the FTM_1 frame as time $t_{a1}$, and may determine the AoD of the FTM_1 frame (denoted in FIG. 5A as $AoD_a$) (516). Device D2 receives the FTM_1 frame from device D1 at time $t_{a2}$, and records the TOA of the FTM_1 frame as time $t_{a2}$ (517).

Device D2 then transmits an ACK frame to device D1 at time $t_{a3}$, and records the TOD of the ACK frame as time $t_{a3}$ (518). Device D1 receives the ACK frame from device D2 at time $t_{a4}$, records the TOA of the ACK frame as time $t_{a4}$, and may determine the AoA of the ACK frame (denoted in FIG. 5A as $AoA_a$) (519).

Then, device D1 may embed a time value and angle information in an FTM_2 frame, and transmit the FTM_2 frame to device D2 at time $t_{b1}$ (520). The time value ($t_{value}$) may indicate a difference in time between the TOA of the ACK frame received at device D1 and the TOD of the FTM_1 frame transmitted from device D1 (e.g., $t_{value}=t_{a4}-t_{a1}$). The angle information, which may indicate a direction of device D2 relative to device D1, may include the AoA of the ACK frame received at device D1 (e.g., $AoA_a$) and/or the AoD of the FTM_1 frame transmitted from device D1 (e.g., $AoD_a$). Note that although device D1 is depicted in FIG. 5A as transmitting a difference time value ($t_{a4}-t_{a1}$), for other embodiments, device D1 may instead embed the timestamps $t_{a1}$ and $t_{a4}$ in the FTM_2 frame. In some aspects, device D1 may record the TOD of the FTM_2 frame as time $t_{b1}$, and may determine the AoD of the FTM_2 frame (denoted in FIG. 5A as $AoD_b$).

Device D2 receives the FTM_2 frame at time $t_{b2}$, and decodes the embedded time value and angle information (521). At this point, device D2 has sufficient information to estimate its location relative to device D1. More specifically, device D2 may estimate that it is a distance d=c*RTT/2 from device D1 along a direction indicated by the angle information embedded within the FTM_2 frame, where $RTT=(t_{a4}-t_{a3})+(t_{a2}-t_{a1})$ (522). Because device D2 may estimate the distance to device D1 (e.g., based on the RTT value) as well as its direction relative to device D1 (e.g., based on the AoA and/or AoD information embedded in the FTM_2 frame), device D2 may estimate its location relative to device D2. If the actual location of device D1 is known, then device D2 may determine its actual location based on the known location of device D1 and its location relative to device D1. For example, if device D1 is an access point and device D2 is a station, then device D2 may retrieve the location of device D1 (e.g., from a local memory such as the Wi-Fi database 241 of FIG. 2 and/or from any suitable service that stores location information for actively deployed access points). Thereafter, device D2 may determine its actual location using the location of device D2 relative to device D1, the determined distance between device D1 and device D2, and the known location of device D1.

Referring again to FIG. 5A, device D2 may transmit an ACK frame to device D1 at time $t_{b3}$ (e.g., to acknowledge reception of the FTM_2 frame). Device D1 receives the ACK frame at time $t_{b4}$, may record the TOA of the ACK frame as time $t_{b4}$, and may determine the AoA of the ACK frame (denoted in FIG. 5A as $AoA_b$). Device D1 may embed another time value and angle information in an FTM_3 frame, and then transmit the FTM_3 frame to device D2 at time $t_{c1}$. The time value embedded in the FTM_3 frame may indicate a difference time value equal to $t_{b4}-t_{b1}$, and the angle information embedded in the FTM_3 frame may include the angle information values $AoA_b$ and/or $AoD_b$.

Thus, as described above, the example embodiments may allow a first wireless device to determine AoA and/or AoD information of a first set of signals exchanged with a second wireless device, and embed the determined AoA and/or AoD information in a second signal transmitted to the second wireless device. The second wireless device may use the embedded AoA and/or AoD information in combination with RTT information to estimate its location relative to the first wireless device.

As mentioned above, the initiator device may request the responder device to commence the ranging operation, for example, by transmitting an FTM_REQ frame to the responder device. The FTM_REQ frame may include a request for the responder device to determine and embed AoA and/or AoD information in one or more subsequent FTM frames. In some aspects, a dedicated bit in the Vendor Specific Information Element (VSIE) of the FTM_REQ frame may be used (e.g., asserted) to request the responder device to determine AoA and/or AoD information and to embed the determined AoA and/or AoD information in subsequent FTM frames. In other aspects, a reserved bit of the FTM_REQ frame's VSIE may be used (e.g., asserted) to request the responder device to determine AoA and/or AoD information and to embed the determined AoA and/or AoD information in subsequent FTM frames. In still other aspects, different bits in the FTM_REQ frame's VSIE may be used (e.g., asserted) to separately request the responder device to embed AoA information and AoD information into subsequent FTM frames. This may be desirable, for example, when the initiator device needs only one of the AoA information and AoD information to determine its direction relative to device D1.

When the responder device receives an FTM_REQ frame that includes a request for AoA and/or AoD information (e.g., the FTM_REQ frame includes an asserted "request" bit in its VSIE), the responder device may infer that the initiator device is capable of decoding AoA and/or AoD information embedded in subsequent FTM frames. In response thereto, the responder device may either (i) assert one or more bits of a VSIE in the first FTM frame (e.g., the FTM_1 frame) indicating its ability to determine AoA and/or AoD information and confirming that the determined AoA and/or AoD information is to be embedded in subsequent FTM frames or (ii) de-assert the one or more bits of the VSIE in the FTM_1 frame indicating its inability to determine AoA and/or AoD information and/or indicating that AoA and/or AoD information will not be embedded in subsequent FTM frames. Alternatively, the responder device may indicate that AoA and/or AoD information will not be included in subsequent FTM frames by not including the VSIE in the FTM_1 frame (e.g., to reduce the transmit time of the first FTM frame). For other embodiments, the responder device may include its acceptance or rejection of the request for AoA and/or AoD information in the ACK frame sent in response to reception of the FTM_REQ frame.

The initiator device may also include, in the FTM_REQ frame, an indication of a desired level of accuracy for AoA and/or AoD measurements by the responder device. The indication of the desired level of accuracy may be embedded in one or more dedicated bits in the VSIE of the FTM_REQ frame, in one or more reserved bits in the VSIE of the FTM_REQ frame, or in any other suitable bits of the FTM_REQ frame. In response to receiving an indication of the desired level of accuracy for AoA and/or AoD measurements, the responder device may include, in the FTM_1 frame, an indication of the level of accuracy for the AoA and/or AoD measurements to be embedded in subsequent FTM frames. The responder device may use the same one or more bit locations of the VSIE in the FTM_1 frame for the response that the initiator device used in the VSIE in the FTM_REQ frame for the request.

For at least some implementations in which the responder device is an access point, the responder device may embed, into a beacon frame, information indicating whether the responder device is capable of estimating AoA and/or AoD information of one or more frames exchanged between the initiator device and the responder device. In some aspects, this information may be embedded within an information element (IE) or a vendor-specific information element (VSIE) of the beacon frame. The responder device may broadcast the beacon frame, for example, according to a target beacon transmission time (TBTT) schedule.

FIG. 6 depicts an example FTM frame 600, in accordance with example embodiments. The FTM frame 600 may include a category field 601, a public action field 602, a dialog token field 603, a follow up dialog token field 604, a TOD field 605, a TOA field 606, a TOD error field 607, a TOA error field 608, an optional LCI report field 609, an optional location civic report field 610, an optional FTM parameters field 611, an optional AoA field 612, and/or an optional AoD field 613. For at least one embodiment, the TOD field 605 may include 6 bytes, the TOA field 606 may include 6 bytes, the AoA field 612 may include 5 bytes, and the AoD field 613 may include 5 bytes (although for other embodiments, other field lengths may be used). The AoA field 612 may include AoA information for frames exchanged during a ranging operation, and the AoD field 613 may include AoD information for frames exchanged during the ranging operation. For example, referring also to FIG. 5A, the responder device (e.g., device D1) may embed AoA information of the received ACK frame into the AoA field 612 of FTM frame 600, and may embed AoD information of the FTM_1 frame into the AoD field 613 of FTM frame 600. In some aspects, the responder device may embed TOA information of the received ACK frame into the TOA field 606 of FTM frame 600, and may embed TOD information of the FTM_1 frame into the TOD field 605 of FTM frame 600. Thereafter, the responder device may use the FTM frame 600 as the FTM_2 frame in the example ranging operation 500 of FIG. 5A, for example, to transmit angle information (e.g., $AoD_a$ and/or $AoA_a$) and the time value (e.g., $t_{a1}-t^{a1}$) to the initiator device.

FIG. 7A depicts an example field 700 that may be one embodiment of the AoA field 612 of FIG. 6. The field 700 may include an Element ID field 701, a Length field 702, and an AoA field 703. For at least one embodiment, the Element ID field 701 may include one byte, the Length field 702 may include one byte, and the AoA field 703 may include 5 bytes (although for other embodiments, other field lengths may be used). The Element ID field 701 may store an element ID value indicating that field 700 contains angle of arrival information for a selected frame (e.g., the AoA information for the ACK frame received from device D2 in the example ranging operation 500 of FIG. 5A). The Length field 702 may store a value indicating a length (in bytes) of field 700. The AoA field 703 may store angle of arrival information for the selected frame. More specifically, in some implementations, the AoA field 703 may store values for Theta_AoA and Phi_AoA which, as described in more detail below with respect to FIG. 10, may indicate angle of arrival information of the selected frame.

FIG. 7B depicts an example field 710 that may be one embodiment of the AoD field 613 of FIG. 6. The field 710 may include an Element ID field 711, a Length field 712, and an AoD field 713. For at least one embodiment, the Element ID field 711 may include one byte, the Length field 712 may include one byte, and the AoD field 713 may include 5 bytes (although for other embodiments, other field lengths may be used). The Element ID field 711 may store an element ID value indicating that field 710 contains angle of departure information for a selected frame (e.g., the AoD information for the FTM_1 frame used in the example ranging operation 500 of FIG. 5A). The Length field 712 may store a value indicating a length (in bytes) of field 710. The AoD field 713 may store angle of departure information for the selected frame. More specifically, in some implementations, the AoD field 713 may store values for Theta_AoD and Phi_AoD which, as described in more detail below with respect to FIG. 10, may indicate angle of departure information of the selected frame.

Figure 8:
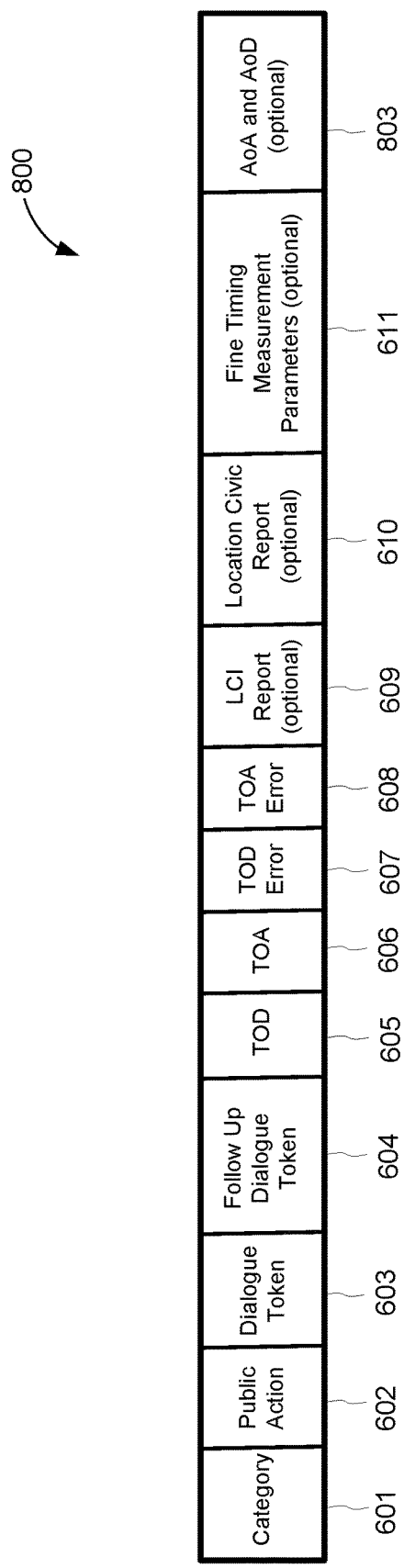
FIG. 8 depicts another example FTM frame in accordance with example embodiments.

FIG. 8 depicts another example FTM frame 800, in accordance with example embodiments. The FTM frame 800 is similar to FTM frame 600 of FIG. 6, except that instead of including separate AoA and AoD fields 612 and 613, respectively, FTM frame 800 includes a combined AoA and AoD field 803. For at least one embodiment, the TOD field 605 may include 6 bytes, the TOA field 606 may include 6 bytes, and the combined AoA and AoD field 803 may include 8 bytes (although for other embodiments, other field lengths may be used). The combined AoA and AoD field 803 may include both AoA and AoD information for frames exchanged during a ranging operation. For example, referring also to FIG. 5A, the responder device (e.g., device D1) may embed AoA information of the received ACK frame and AoD information of the FTM_1 frame into the combined AoD and AoD field 803 of FTM frame 800. In some aspects, the responder device may embed TOA information of the received ACK frame into the TOA field 606 of FTM frame 800, and may embed TOD information of the FTM_1 frame into the TOD field 605 of FTM frame 800. Thereafter, the responder device D1 may use the FTM frame 800 as the FTM_2 frame in the example ranging operation 500 of FIG. 5, for example, to transmit information indicating values for $AoD_a$, $AoA_a$, and $t_{a4}-t_{a1}$ to device D2.

For example embodiments in which the AoA field 612 and the AoD field 613 of FTM frame 600 each include 5 bytes and the combined AoA and AoD field 803 of FTM frame 800 includes 8 bytes, the FTM frame 800 of FIG. 8 may include 2 fewer bytes than the FTM frame 600 of FIG. 6, and thus may be transmitted in less time than FTM frame 600 (albeit at a cost of less resolution).

Figure 9:
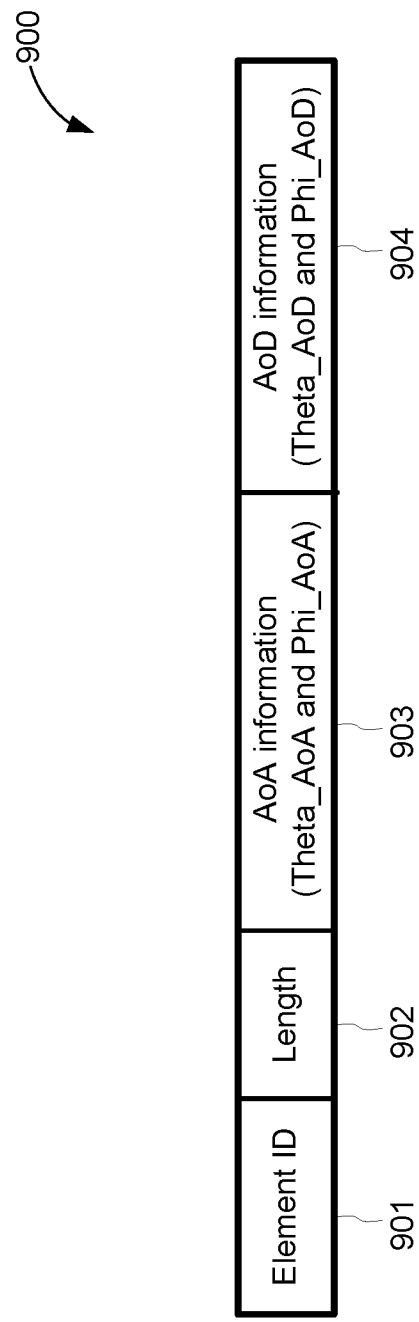
FIG. 9 depicts an example angle of arrival and angle of departure field of the FTM frame of FIG. 8, in accordance with example embodiments.

FIG. 9 depicts an example field 900 that may be one embodiment of the combined AoA and AoD 803 of FIG. 8. The field 900 may include an Element ID field 901, a Length field 902, an AoA field 903, and an AoD field 904. For at least one embodiment, the Element ID field 901 may include one byte, the Length field 902 may include one byte, the AoA field 903 may include 3 bytes, and the AoD field 904 may include 3 bytes (although for other embodiments, other field lengths may be used). The Element ID field 901 may store an element ID value indicating that field 900 contains angle of arrival and angle of departure information for a selected frame exchange (e.g., the AoA of the ACK frame received from device D2 and the AoD of the FTM_1 frame in the example ranging operation 500 of FIG. 5A). The Length field 902 may store a value indicating a length (in bytes) of field 900. The AoA field 903 may store angle of arrival information for the selected frame exchange, and the AoD field 904 may store angle of departure information for the selected frame exchange. More specifically, in some implementations, the AoA field 903 may store values for Theta_AoA and Phi_AoA, and the AoD field 904 may store values for Theta_AoD and Phi_AoD which, as described in more detail below with respect to FIG. 10, may indicate angle of arrival and angle of departure information for frames exchanged during a ranging operation.

Figure 10:
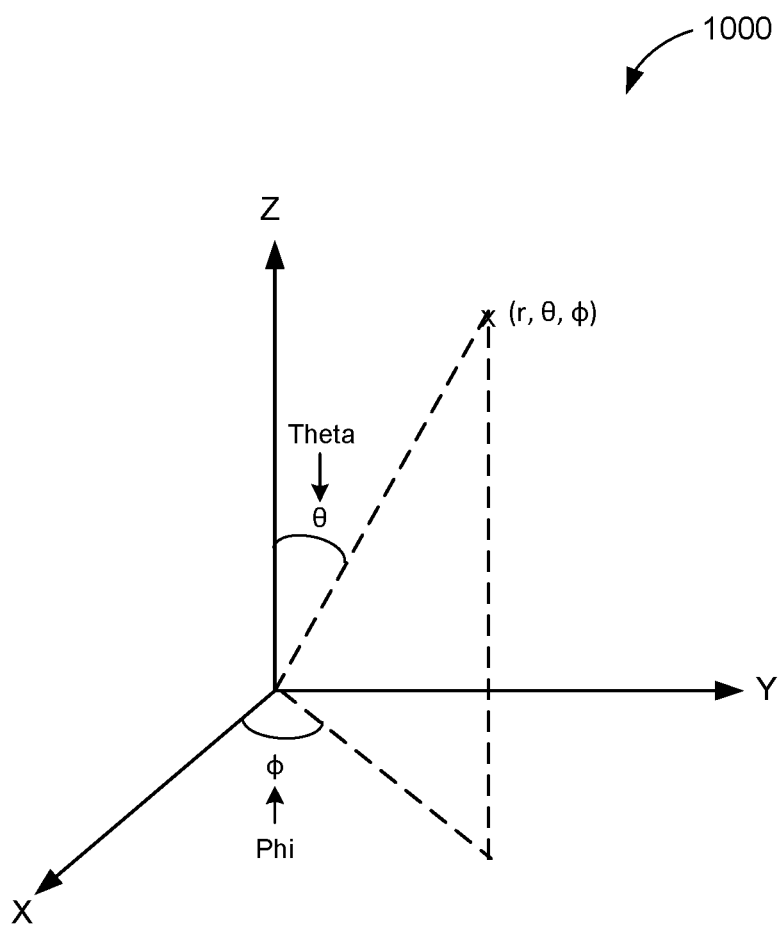
FIG. 10 depicts a coordinate system for use with example embodiments.

FIG. 10 is an example 3-dimensional coordinate system 1000 for representing the position of a wireless device using a radius "r" and angles "theta" and "phi." As depicted in FIG. 10, phi may be an angle with respect to the horizontal (x-y) plane, while theta may be an angle with respect to the vertical (z) axis. Phi may range from 0° to 360°, while theta may range from 0° to 180°. The radius r is the distance between the origin and a point coordinate (r, θ, and φ) representing the location of a wireless device relative to the origin.

Referring also to FIG. 9, the first 12 bits of the AoA field 903 may be used to indicate a value for Theta_AoA, and the second 12 bits of the AoA field 903 may be used to indicate a value for Phi_AoA. Similarly, the first 12 bits of the AoD field 904 may be used to indicate a value for Theta_AoD, and the second 12 bits of the AoD field 904 may be used to indicate a value for Phi_AoD. For the example field 900 of FIG. 9, the 12-bit values for Theta_AoA and Theta_AoD may provide a resolution of approximately 0.044° (180° divided by ($2^{12}-1$)), while the 12-bit values for Phi_AoA and Phi_AoD may provide a resolution of approximately 0.088° (360° divided by ($2^{12}-1$)).

FTM frames formatted according to current FTM protocols (e.g., as defined by the IEEE 802.11 REVmc standards) include a 6-byte TOD field and a 6-byte TOA field to store TOD and TOA information, respectively (e.g., to embed timestamp values $t_{a1}$ and $t_{a4}$ of FIG. 5A). Because an RTT value may be calculated using a single time difference value (e.g., $t_{a4}-t_{a1}$) rather than two individual timestamp values (e.g., $t_{a4}$ and $t_{a1}$), one of these TOD and TOA fields may be re-purposed to store AoA and AoD information, thereby eliminating the need for an FTM frame to include a separate field that stores AoA and AoD information (and thus reducing the size of the FTM frame).

More specifically, in accordance with example embodiments, one of the TOD and TOA fields of an FTM frame may be used store a single time difference value for a ranging operation, and the other of the TOD and TOA fields of the FTM frame may be used to store AoA and AoD information for the ranging operation without compromising accuracy of RTT estimates. Referring also to FIGS. 5A, 6, and 8, for some implementations, the TOD field 605 of FTM frame 600 or FTM frame 800 may be used to store the time value ($t_{a4}-t_{a1}$), and the TOA field 606 of FTM frame 600 or FTM frame 800 may be used to store AoA and AoD information (e.g., $AoA_a$ and $AoD_a$). In some aspects, the TOA field 606 may store four 12-bit values: Theta_AoA, Phi_AoA, Theta_AoD, and Phi_AoD. The format of the TOA field 606 may be expressed as:

{Theta_AoA[0:11],Phi_AoA[0:11],Theta_AoD[0:11], Phi_AoD[0:11]}.

For other implementations, the TOA field 606 of FTM frame 600 or FTM frame 800 may be used to store the time difference value ($t_{41}-t_{a1}$), and the TOD field 605 of FTM frame 600 or FTM frame 800 may be used to store AoA and AoD information (e.g., $AoA_a$ and $AoD_a$). In some aspects, the TOD 605 field may store four 12-bit values: Theta_AoA, Phi_AoA, Theta_AoD, and Phi_AoD. The format of the TOD field 605 may be expressed as:

{Theta_AoA[0:11],Phi_AoA[0:11],Theta_AoD[0:11], Phi_AoD[0:11]}.

Any suitable techniques may be used to estimate AoA information of frames received by the responder device and/or to estimate AoD information for frames transmitted from the responder device. For at least some embodiments, the responder device may use a number of different antenna patterns when estimating the AoA information of ACK frames received from the initiator device. More specifically, when the responder device includes a number N≥2 antennas, the responder device may selectively enable different combinations of the antennas and estimate the channel conditions for a corresponding number of different antenna patterns. The channel condition estimates may be used to estimate AoA information of the ACK frame for various antenna patterns. Because ACK frames typically include one or more predetermined bit patterns (e.g., known to the responder device), ACK frames may be well suited for estimating channel conditions.

The responder device may use the entire ACK frame for estimating channel conditions and/or estimating AoA information. Using the entire ACK frame may allow the responder device to switch between the various antenna patterns during reception of the ACK frame. When the responder device cannot process the entire ACK frame (e.g., the responder device may be able to process only legacy fields such as the legacy long training field (L-LTF)), then the responder device may estimate the channel conditions and AoA information using a sequence of N exchanged FTM and ACK frames (e.g., using one FTM/ACK frame exchange for each antenna pattern).

As mentioned above, the responder device may estimate AoA information using any suitable technique. These techniques may include (but are not limited to): correlation; maximum likelihood estimation; Multiple Signal Classification (MUSIC) techniques, including variants such as Root-MUSIC, Cyclic MUSIC, or Smooth MUSIC; Estimation of Signal Parameters using Rotational Invariance Techniques (ESPRIT); Matrix Pencil; or other techniques for estimating AoA information.

Thus, as described above with respect to FIG. 10, an initiator device may use RTT information and AoA/AoD information to estimate a relative distance vector indicating its position relative to a responder device. If the 3-dimensional (3D) location of the responder device is known, then the relative distance vector may allow the initiator device to estimate its own 3D location. If only the 2-dimensional (2D) location of the responder device is known, then the initiator device may estimate its own 2D location by projecting the estimated relative distance vector onto the 2D plane.

Figure 11:
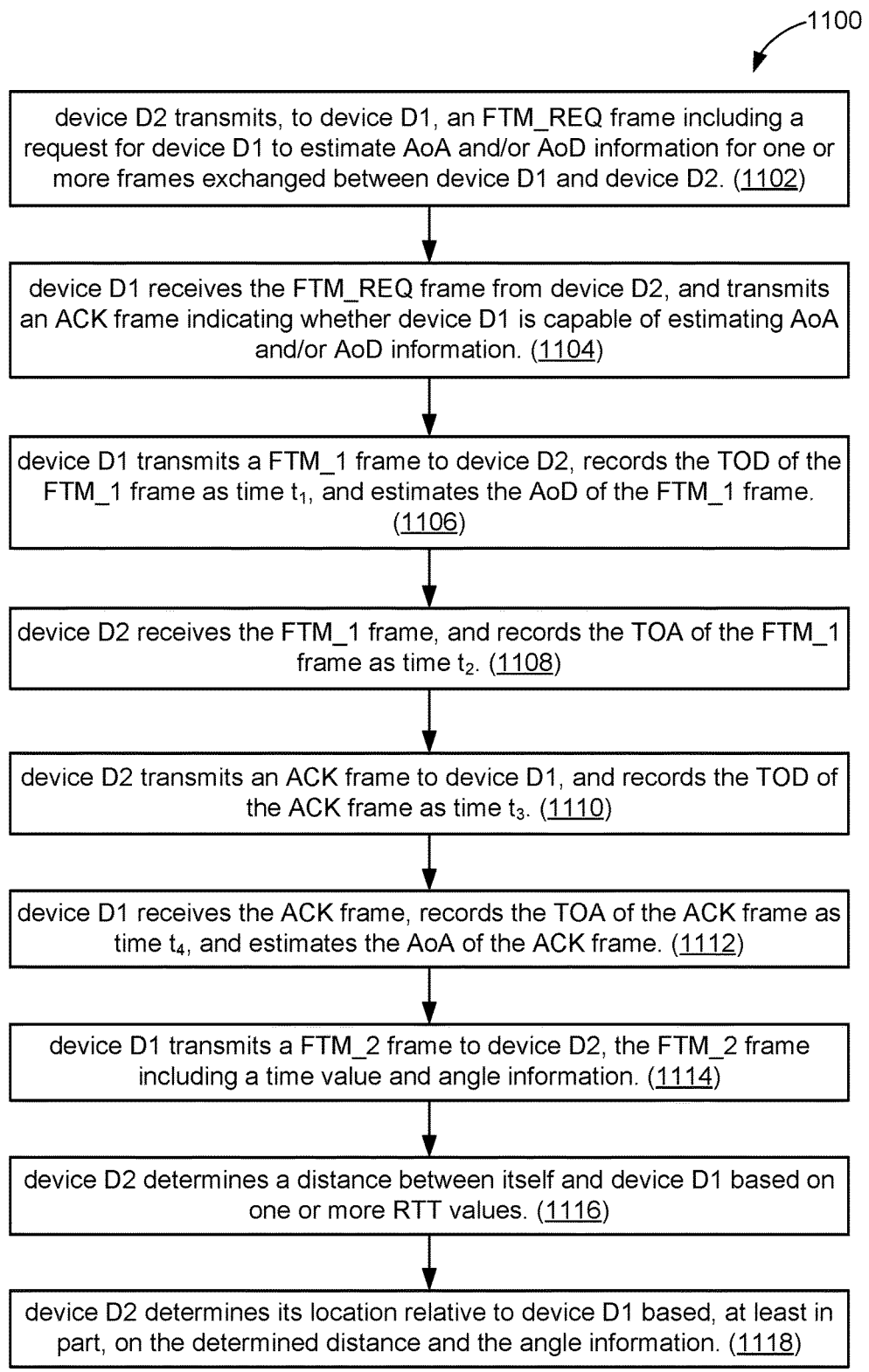
FIG. 11 shows an illustrative flowchart depicting an example ranging operation in accordance with example embodiments.

FIG. 11 is an illustrative flow chart 1100 depicting an example ranging operation between a first device D1 and a second device D2 in accordance with example embodiments. Device D1 and device D2 may each be, for example, an access point (e.g., AP 110 of FIG. 1), a station (e.g., one of stations STA1-STA4 of FIG. 1), or other suitable wireless device (e.g., wireless device 200 of FIG. 2). For the example operation of FIG. 11, device D2 is the initiator device, and device D1 is the responder device. First, device D2 transmits, to device D1, an FTM_REQ frame that includes a request for device D1 to estimate AoA and/or AoD information for one or more frames exchanged between device D1 and device D2 (1102). The FTM_REQ frame may also indicate a desired level of accuracy for the requested AoA/AoD information.

Device D1 receives the FTM_REQ frame, and then transmits an ACK frame indicating whether device D1 is capable of estimating AoA and/or AoD information (and whether the estimated AoA and/or AoD information will be included in subsequent FTM frames) (1104). The ACK frame may include the level of accuracy to be provided for the requested AoA/AoD information.

Device D1 transmits an FTM_1 frame to device D2, records the TOD of the FTM_1 frame as time $t_1$, and estimates the AoD of the FTM_1 frame (1106). For other embodiments, the FTM_1 frame may indicate whether device D1 is capable of estimating AoA and/or AoD information (and whether the estimated AoA and/or AoD information will be included in subsequent FTM frames). Device D2 receives the FTM_1 frame, and records the TOA of the FTM_1 frame as time $t_2$ (1108).

Device D2 transmits an ACK frame to device D1, and records the TOD of the ACK frame as time $t_3$ (1110). Device D1 receives the ACK frame at time $t_4$, records the TOA of the ACK frame as time $t_4$, and estimates the AoA of the ACK frame (1112).

Device D1 transmits, to device D2, an FTM_2 frame that includes a time value and angle information (1114). The time value may indicate a difference in time between the TOD of the FTM_1 frame transmitted from device D1 and the TOA of the ACK frame received at device D1 (e.g., the time value may be equal to $t_4-t_1$). The angle information may indicate a direction of device D2 relative to device D1. In some aspects, the angle information may include the AoD of the FTM_1 frame transmitted from device D1 and/or the AoA of the ACK frame received at device D1 (1114). For other embodiments, the FTM_2 frame may include the actual timestamps for times $t_1$ and $t_4$ (e.g., rather than the time value indicating the difference in time between time $t_4$ and time $t_1$).

Device D2 may determine a distance between itself and device D1 based on one or more RTT values (1116). For example, device D2 may determine the distance d between device D1 and device D2 using the expression d=c*RTT/2, where c is the speed of light, and RTT is the summation of the actual signal propagation times of the FTM_1 frame and the ACK frame. More specifically, the value of RTT may be determined as $(t_4-t_1)-(t_3-t_2)$. Thereafter, device D2 may determine its location relative to device D1 based, at least in part, on the determined distance and the angle information (1118).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, one aspect of the disclosure can include a non-transitory computer readable media embodying a method for time and frequency synchronization in non-geosynchronous satellite communication systems. The term "non-transitory" does not exclude any physical storage medium or memory and particularly does not exclude dynamic memory (e.g., conventional random access memory (RAM)) but rather excludes only the interpretation that the medium can be construed as a transitory propagating signal.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A method of performing a ranging operation between a first device and a second device, the method performed by one or more processors of the second device and comprising:
   transmitting, to the first device, a fine timing measurement (FTM) request frame including a request, embedded within a vendor specific information element (VSIE) of the FTM request frame, for the first device to estimate angle of arrival (AoA) information or angle of departure (AoD) information for one or more frames exchanged between the first device and the second device;
   receiving a first FTM frame from the first device;
   transmitting an acknowledgement (ACK) frame to the first device; and
   receiving a second FTM frame from the first device, the second FTM frame comprising:
      a time value indicating a difference between a time of departure (TOD) of the first FTM frame and a time of arrival (TOA) of the ACK frame; and
      angle information indicating a direction of the second device relative to the first device.

2. The method of claim 1, further comprising:
   determining a position of the second device, relative to the first device, based at least in part on the time value and the angle information received in the second FTM frame.

3. The method of claim 2, wherein the determining comprises:
   determining a round trip time (RTT) of the first FTM frame and the ACK frame based on the time value; and
   estimating the relative position of the second device based, at least in part, on the RTT and the angle information.

4. The method of claim 1, wherein the request indicates a desired level of accuracy for the AoA information or the AoD information.

5. The method of claim 4, further comprising:
   receiving a response frame from the first device in response to the request, the response frame indicating the level of accuracy to be provided for the AoA information or the AoD information.

6. The method of claim 1, further comprising:
   receiving a response frame from the first device in response to the request, the response frame indicating whether the first device is capable of estimating the AoA information or the AoD information.

7. The method of claim 1, further comprising:
   receiving a beacon frame from the first device, the beacon frame indicating whether the first device is capable of estimating angle of arrival (AoA) information or angle of departure (AoD) information.

8. The method of claim 1, wherein the angle information is embedded within one member of the group consisting of a TOD field and a TOA field of the second FTM frame.

9. The method of claim 8, wherein the time value is embedded within the other member of the group consisting of the TOD field and the TOA field of the second FTM frame.

10. The method of claim 1, wherein the angle information is at least one member of the group consisting of an angle of arrival (AoA) of the ACK frame and an angle of departure (AoD) of the first FTM frame.

11. A second device to perform a ranging operation with a first device, the second device comprising:
   one or more processors; and
   a memory configured to store instructions that, when executed by the one or more processors, causes the second device to:
      transmit, to the first device, a fine timing measurement (FTM) request frame including a request, embedded within a vendor specific information element (VSIE) of the FTM request frame, for the first device to estimate angle of arrival (AoA) information or angle of departure (AoD) information for one or more frames exchanged between the first device and the second device;
      receive a first FTM frame from the first device;
      transmit an acknowledgement (ACK) frame to the first device; and
      receive a second FTM frame from the first device, the second FTM frame comprising:
         a time value indicating a difference between a time of departure (TOD) of the first FTM frame and a time of arrival (TOA) of the ACK frame; and
         angle information indicating a direction of the first device relative to the second device.

12. The second device of claim 11, wherein execution of the instructions causes the second device to:

determine a position of the second device, relative to the first device, based at least in part on the time value and the angle information received in the second FTM frame.

13. The second device of claim 12, wherein execution of the instructions to determine the position causes the second device to:
   determine a round trip time (RTT) of the first FTM frame and the ACK frame based on the time value; and
   estimate the relative position of the second device based, at least in part, on the RTT and the angle information.

14. The second device of claim 11, wherein the request indicates a desired level of accuracy for the AoA information or the AoD information.

15. The second device of claim 14, wherein execution of the instructions causes the second device to:
   receive a response frame from the first device in response to the request, the response frame indicating the level of accuracy to be provided for the AoA information or the AoD information.

16. The second device of claim 11, wherein execution of the instructions causes the second device to:
   receive a response frame from the first device in response to the request, the response frame indicating whether the first device is capable of estimating the AoA information or the AoD information.

17. The second device of claim 11, wherein execution of the instructions causes the second device to:
   receive a beacon frame from the first device, the beacon frame indicating whether the first device is capable of estimating angle of arrival (AoA) information or angle of departure (AoD) information.

18. The second device of claim 11, wherein the angle information is embedded within one member of the group consisting of a TOD field and a TOA field of the second FTM frame.

19. The second device of claim 18, wherein the time value is embedded within the other member of the group consisting of the TOD field and the TOA field of the second FTM frame.

20. The second device of claim 11, wherein the angle information is at least one member of the group consisting of an angle of arrival (AoA) of the ACK frame and an angle of departure (AoD) of the first FTM frame.

21. A non-transitory computer-readable storage medium storing one or more programs containing instructions that, when executed by one or more processors of a second device, cause the second device to perform a ranging operation with a first device by performing operations comprising:
   transmitting, to the first device, a fine timing measurement (FTM) request frame including a request, embedded within a vendor specific information element (VSIE) of the FTM request frame, for the first device to estimate angle of arrival (AoA) information or angle of departure (AoD) information for one or more frames exchanged between the first device and the second device;
   receiving a first FTM frame from the first device;
   transmitting an acknowledgement (ACK) frame to the first device; and
   receiving a second FTM frame from the first device, the second FTM frame comprising:
      a time value indicating a difference between a time of departure (TOD) of the first FTM frame and a time of arrival (TOA) of the ACK frame; and
      angle information indicating a direction of the second device relative to the first device.

22. The non-transitory computer-readable storage medium of claim 21, wherein execution of the instructions causes the second device to perform operations further comprising:
   determining a position of the second device, relative to the first device, based at least in part on the time value and the angle information received in the second FTM frame.

23. The non-transitory computer-readable storage medium of claim 22, wherein execution of the instructions for determining the position causes the second device to perform operations further comprising:
   determining a round trip time (RTT) of the first FTM frame and the ACK frame based on the time value; and
   estimating the relative position of the second device based, at least in part, on the RTT and the angle information.

24. The non-transitory computer-readable storage medium of claim 21, wherein the request indicates a desired level of accuracy for the AoA information or the AoD information.

25. The non-transitory computer-readable storage medium of claim 24, wherein execution of the instructions causes the second device to perform operations further comprising:
   receiving a response frame from the first device in response to the request, the response frame indicating the level of accuracy to be provided for the AoA information or the AoD information.

26. The non-transitory computer-readable storage medium of claim 21, wherein execution of the instructions causes the second device to perform operations further comprising:
   receiving a response frame from the first device in response to the request, the response frame indicating whether the first device is capable of estimating the AoA information or the AoD information.

27. The non-transitory computer-readable storage medium of claim 21, wherein execution of the instructions causes the second device to perform operations further comprising:
   receiving a beacon frame from the first device, the beacon frame indicating whether the first device is capable of estimating angle of arrival (AoA) information or angle of departure (AoD) information.

28. The non-transitory computer-readable storage medium of claim 21, wherein the angle information is embedded within one member of the group consisting of a TOD field and a TOA field of the second FTM frame.

29. The non-transitory computer-readable storage medium of claim 28, wherein the time value is embedded within the other member of the group consisting of the TOD field and the TOA field of the second FTM frame.

30. The non-transitory computer-readable storage medium of claim 21, wherein the angle information is at least one member of the group consisting of an angle of arrival (AoA) of the ACK frame and an angle of departure (AoD) of the first FTM frame.

31. A second device to perform a ranging operation with a first device, the second device comprising:
   means for transmitting, to the first device, a fine timing measurement (FTM) request frame including a request, embedded within a vendor specific information element (VSIE) of the FTM request frame, for the first device to estimate angle of arrival (AoA) information or angle of departure (AoD) information for one or more frames exchanged between the first device and the second device;

means for receiving a first FTM frame from the first device;

means for transmitting an acknowledgement (ACK) frame to the first device; and means for receiving a second FTM frame from the first device, the second FTM frame comprising:
   a time value indicating a difference between a time of departure (TOD) of the first FTM frame and a time of arrival (TOA) of the ACK frame; and
   angle information indicating a direction of the second device relative to the first device.

32. The second device of claim 31, further comprising:
means for determining a position of the second device, relative to the first device, based at least in part on the time value and the angle information received in the second FTM frame.

33. The second device of claim 32, wherein the means for determining the position causes the second device to:
   determine a round trip time (RTT) of the first FTM frame and the ACK frame based on the time value; and
   estimate the relative position of the second device based, at least in part, on the RTT and the angle information.

34. The second device of claim 31, wherein the request indicates a desired level of accuracy for the AoA information or the AoD information.

35. The second device of claim 31, further comprising:
   means for receiving a beacon frame from the first device, the beacon frame indicating whether the first device is capable of estimating angle of arrival (AoA) information or angle of departure (AoD) information.

36. The second device of claim 31, wherein the angle information is at least one member of the group consisting of an angle of arrival (AoA) of the ACK frame and an angle of departure (AoD) of the first FTM frame.

* * * * *